(12) United States Patent
Bowman et al.

(10) Patent No.: US 12,333,274 B2
(45) Date of Patent: Jun. 17, 2025

(54) DATA-TYPE-AWARE CLOCK-GATING

(71) Applicant: Amazon Technologies, Inc., Seattle, WA (US)

(72) Inventors: Joshua Wayne Bowman, Austin, TX (US); Thomas A. Volpe, Austin, TX (US); Sundeep Amirineni, Austin, TX (US); Nishith Desai, Austin, TX (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 17/247,475

(22) Filed: Dec. 11, 2020

(65) Prior Publication Data

US 2022/0188073 A1    Jun. 16, 2022

(51) Int. Cl.
*G06F 7/544* (2006.01)
*G06F 1/3237* (2019.01)

(52) U.S. Cl.
CPC .......... *G06F 7/5443* (2013.01); *G06F 1/3237* (2013.01)

(58) Field of Classification Search
CPC ............... G06F 7/5443; G06F 1/04–10; G06F 1/3234–3296
See application file for complete search history.

(56) References Cited

U.S. PATENT DOCUMENTS

| | | | |
|---|---|---|---|
| 8,051,123 B1 | 11/2011 | Oberman et al. | |
| 8,346,830 B2 | 1/2013 | Muraki | |
| 8,650,231 B1 * | 2/2014 | Langhammer | G06F 7/483 708/204 |
| 11,321,096 B2 * | 5/2022 | Martin | G06F 7/50 |
| 2013/0194016 A1 * | 8/2013 | Wimer | H03K 19/0016 327/199 |
| 2014/0122555 A1 * | 5/2014 | Hickmann | G06F 7/57 708/523 |

(Continued)

FOREIGN PATENT DOCUMENTS

GB    2568085 A    5/2019

OTHER PUBLICATIONS

L. Touil, A. Hamdi, I. Gassoumi, and A. Mtibaa, 'Design of low-power structural FIR filter using data-driven clock gating and multibit flip-flops', Journal of Electrical and Computer Engineering, 2020. (Year: 2020).*

(Continued)

*Primary Examiner* — Michael D. Yaary
(74) *Attorney, Agent, or Firm* — Weaver Austin Villeneuve & Sampson LLP

(57) ABSTRACT

To reduce power consumption, data bits or a portion of a data register that is not expected to toggle frequently can be grouped together, and be clock-gated independently from the rest of the data register. The grouping of the data bits can be determined based on the data types of the workload being operated on. For a data register configured to store a numeric value that supports multiple data types, the portion of the data register being clock-gated may store a group of data bits that are unused for one or more data types of the multiple data types supported by the data register. The portion of the data register being clock-gated can also be a group of data bits that remain unchanged or have a constant value for numeric values within a certain numeric range that is frequently operated on.

20 Claims, 12 Drawing Sheets

(56) References Cited

U.S. PATENT DOCUMENTS

| | | |
|---|---|---|
| 2017/0221550 A1 | 8/2017 | Diril et al. |
| 2018/0032381 A1* | 2/2018 | Ki ........................ G06F 9/4806 |
| 2019/0101952 A1 | 4/2019 | Diamond et al. |
| 2019/0236049 A1* | 8/2019 | Vantrease .............. G06N 3/063 |
| 2021/0103429 A1* | 4/2021 | Nair ....................... G06F 7/485 |
| 2021/0157548 A1* | 5/2021 | Elmer .................. G06F 7/5443 |
| 2021/0174179 A1 | 6/2021 | Song et al. |
| 2021/0255830 A1* | 8/2021 | Ulrich .................. G06F 7/4876 |
| 2022/0164164 A1* | 5/2022 | Kwon .................. G06F 7/5443 |
| 2022/0350567 A1* | 11/2022 | Pan ....................... G06F 7/4876 |

OTHER PUBLICATIONS

T. Okuhira and T. Ishihara, "Unification of Multiple Gated Flip-Flops for Saving the Power Consumption of Register Circuits," in Kyushu University Institutional Repository, 2010, pp. 1-7. (Year: 2010).*

Brooks, D. et al., "Value-Based Clock Gating and Operation Packing: Dynamic Strategies for Improving Processor Power and Performance", *ACM Transactions on Computer Systems*, May 2000, vol. 18, No. 2, pp. 89-126.

International Search Report and Written Opinion dated Mar. 31, 2022, in PCT Application No. PCT/US2021/072814.

Communication under Rules 161(1) and 162 EPC dated Jul. 21, 2023 in Application No. EP21840398.8.

EP Office Action dated May 7, 2024 in EP Application No. 21840398.8.

EP Office Action dated Nov. 8, 2024 in EP Application No. 21840398.8.

\* cited by examiner

DATA-TYPE-AWARE CLOCK-GATING

BACKGROUND

Artificial neural networks utilize a computational model with an architecture based on biological neural networks. Computations in an artificial neural network are performed using a set of weights representing a neural network model. The weights can be combined with input data (also referred to as feature maps) to perform an inference operation. For example, in a computer vision application, the neural network can combine the weights with an input image to extract certain features of the image. Based on the extracted features, the neural network can generate a decision as to whether a particular object is depicted in the image. Neural networks can be trained with training data to adjust the weight values of the model to improve accuracy of the inference operation.

BRIEF DESCRIPTION OF THE DRAWINGS

Various embodiments in accordance with the present disclosure will be described with reference to the drawings, in which.

DETAILED DESCRIPTION

Neural networks rely heavily on matrix computations. Weights and feature maps are typically represented as matrices, and a series of matrix multiplications (e.g., dot-products) are performed on these matrices and intermediate results at the various layers of a neural networks to generate a computational result. To perform these computations efficiently, accelerators such as neural network processors can be implemented using an array of processing elements arranged in rows and columns. Each processing element can perform a multiply-and-accumulate operation by multiplying a feature map value with a weight value to generate a multiplication result, and add the multiplication result to a partial sum input to generate a partial sum output. This partial sum output is fed as a partial sum input to the next processing element. Although such accelerators can perform neural network computations more efficiently than general purpose processors, the massive amount of calculations being performed can result in significant power consumption.

To reduce power consumption for neural network computations, a data-type-aware clock-gating technique can be applied to the integrated circuit design of the accelerator. Numeric values such as feature maps and weights are stored in data registers in each processing element of the array. These values can be represented in various data types, and are converted into a common format for storage in the data registers of the processing element. Certain input data types do not require the full bit width of the data register. By clock-gating the unused bits of the data register together, the dynamic power consumption of the data register can be reduced when processing input data types that do not use the clock-gated bits of the data register. A majority of neural network computations are also performed with small values. Hence, data bits used for large numeric values such as the most significant bits of the exponent can also be clock-gated together to reduce dynamic power consumption, because these bits are not expected to change frequently. Furthermore, bits that are clock-gated together can be implemented as multi-bit flip flops in the data register to reduce clock tree routing and buffers, and to minimize the layout area of the circuit design.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiments being described.

Figure 1:
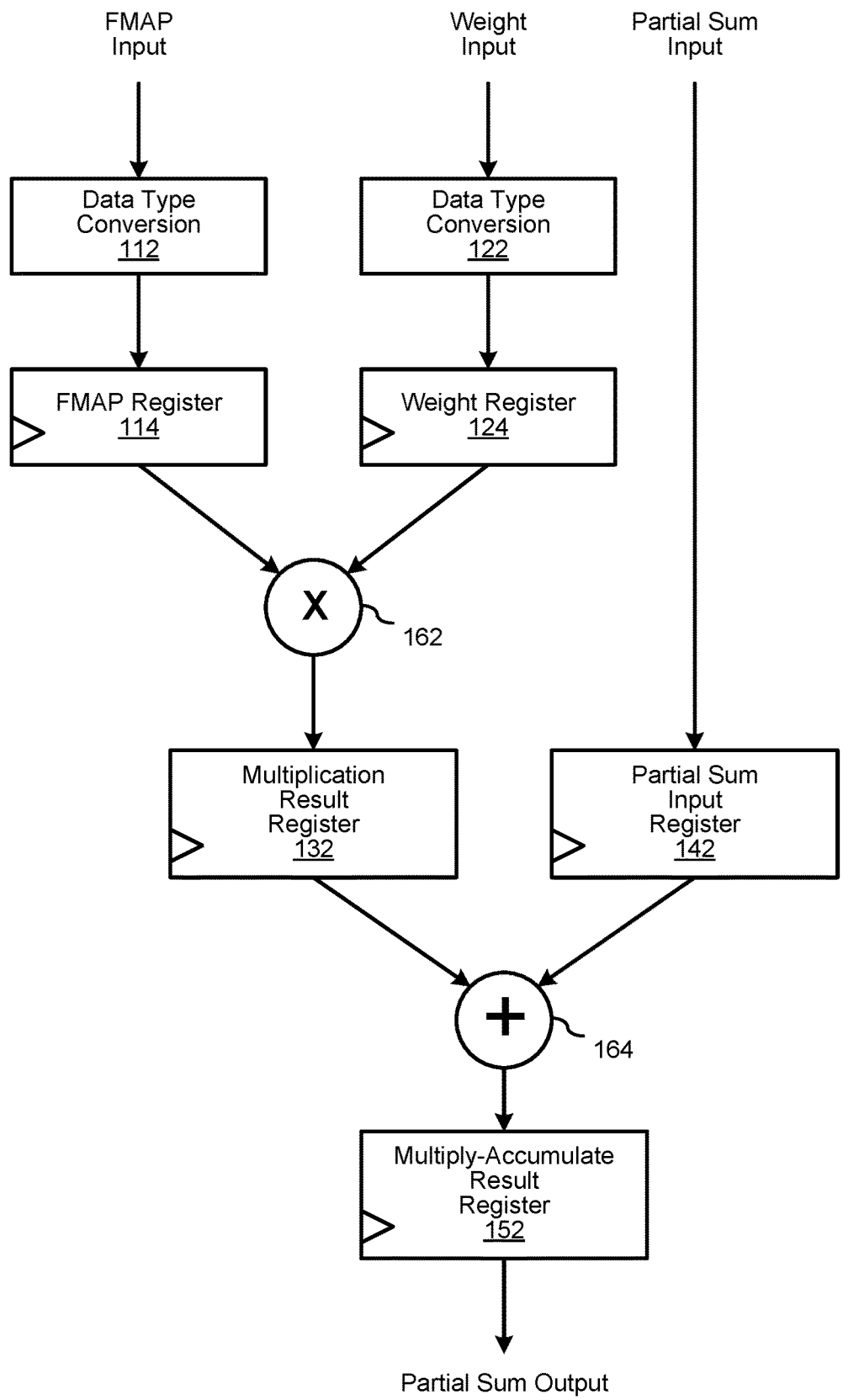
FIG. 1 illustrates a conceptual diagram of an example of a neural network computation.

FIG. 1 illustrates a conceptual diagram of an example of a neural network computation that can be performed by a logic block (e.g., a processing element) in an integrated circuit device (e.g., an accelerator such as a neural network processor, a graphics processing unit, or other computing devices such as a processor, arithmetic logic unit, etc.). The neural network computation shown in FIG. 1 multiplies a weight input value with a feature map (FMAP) input value, and add the multiplication result to a partial sum input to generate a partial sum output. This operation can be referred to as a fused multiply-add operation or a multiply-and-accumulate operation.

The processing element performing the computation may receive a feature map input value and a weight input value. These values can be represented in various data types such as 8-bit floating-point (FP8), 16-bit floating-point (FP16), brain floating-point (BF16), 32-bit floating-point (FP32), or other suitable data types. In order to support the various data types, the feature map (FMAP) input and the weight input are converted by data type conversion units 112 and 122 into a native format of the processing element. The data conversion can be performed by software or hardware prior to the processing element receiving the feature map input value and the weight input value. The converted values are respectively stored in a FMAP register 114 and a weight register 124. In some implementations, the native format of the processing element can be a 22-bit floating-point (FP22) format that includes a 1-bit sign, 10-bit exponent, and 11-bit mantissa. Thus, FMAP register 114 and weight register 124 can each be a 22-bit data register. In other implementations, other suitable native formats with same or different number of exponent and/or mantissa bits can be used.

The data type conversion can be performed, for example, by padding the component (e.g., exponent, mantissa, etc.) of the input value with zeros, or leaving certain bits unused in the data register when the component of the input value has fewer bits than the corresponding component in the native format. When the component of the input value has more bits that the corresponding component in the native format, the data type conversion can be performed, for example, by truncating certain bits of the input value to round the number, or be represented in the native format using quantization techniques to preserve the dynamic range of the input data type.

Once converted into the native format, a multiplier 162 can multiply the FMAP value stored in FMAP register 114 with the weight value stored in weight register 124 to generate a multiplication result. The multiplication result can then be stored in a multiplication result register 132. In implementation in which the native format of the FMAP and weight values is FP22, the multiplication result can be a 34-bit floating-point (FP34) number. Thus, multiplication result register 132 can be a 34-bit data register. In other implementations in which a different native format is used for the FMAP value and/or weight value, multiplication result register 132 may contain a different number of data bits to store the multiplication result.

The processing element performing the neural network computation may also receive a partial sum input (which is the result of a previous fused multiply-add operation), and store the partial sum input in a partial sum input register 142. The partial sum input can be in the same format as the multiplication result. As such, in implementation in which the multiplication result is a FP34 number, the partial sum input can also be a FP34 number and partial sum input register 142 can be a 34-bit data register. An adder 164 then adds the multiplication result stored in multiplication result register 132 to the partial sum input stored in partial sum input register 142 to generate a partial sum output. The partial sum output can be stored in a multiply-accumulate result register 152, and be provided to the next processing element as a partial sum input of that next processing element. The partial sum output can be in the same format as the partial sum input. Thus, in implementation in which the partial sum input is a FP34 number, the partial sum output can also be a FP34 number, and multiply-accumulate result register 152 can be a 34-bit data register.

An integrated circuit device that performs such neural network computations can have hundreds or even thousands of logic blocks (e.g., processing elements) to perform the computation shown in FIG. 1 to achieve highly parallelized matrix multiplication operations.

Such computations can also be performed millions of times during execution of the neural network. As such, reducing the power consumption of the logic block performing such computations can result in significant power savings during operation of the integrated circuit device.

Figure 2:
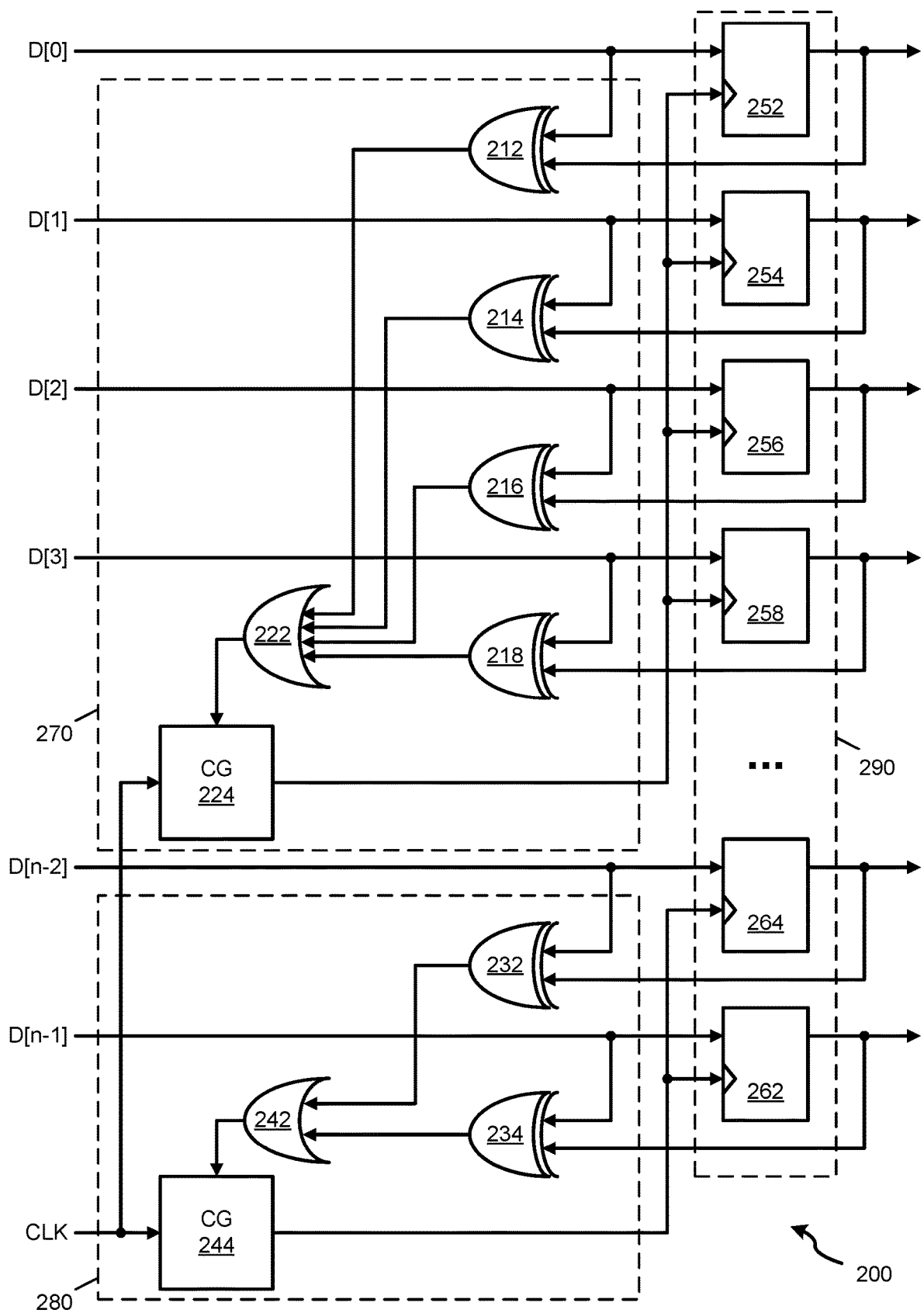
FIG. 2 illustrates a block diagram of an example of an integrated circuit having an n-bit data register.

FIG. 2 illustrates a block diagram of an example of an integrated circuit 200 having an n-bit data register 290. The n-bit register can be used to implement, for example, the FMAP register and/or weight register of a processing element. The n-bit data register 290 includes flip-flops 252, 254, 256, 258, 264, and 262. Although only 6 flip-flops are shown in FIG. 2, it should be understood that the n-bit data register 290 may include fewer or more flip-flops to implement then number of data bits in the data register 290. Flip-flop 252 is driven by data bit D[0]; flip-flop 254 is driven by data bit D[1]; flip-flop 256 is driven by data bit D[2]; flip-flop 258 is driven by data bit D[3]; flip-flop 264 is driven by data bit D[n−2]; and flip-flop 262 is driven by data bit D[n−1]. Each of the flip-flops is also driven by a clock signal.

To reduce the dynamic power consumption of the n-bit data register 290, a number of flip-flops storing certain data bits can be grouped together and be clock-gated independently from the rest of the data register. Clock-gating a flop-flip disables the clock signal to the flip-flop to reduce switching activity in the flip-flop. When the data input to the flip-flop has the same logic value as the previously stored value in the flip-flop, the clock signal can be disabled without affecting the functionality of the data register because the data output of the flip-flop will be at the same logic value as the data input. Although it is possible to clock-gate each flip-flop independently, doing so may significantly increase the area of the integrated circuit device because of the additional clock-gate circuitry. As such, strategically grouping data bits together for clock-gating can strike a balance between power savings and layout area.

Referring to FIG. 2, data bits D[3:0] can be grouped together and clock-gated by a clock-gate circuit 270. Clock-gate circuit 270 includes XOR gates 212, 214, 216, and 218. More generally, the clock-gate circuit may include the same number of XOR gates as the number of data bits being grouped together. XOR gate 212 compares the data input D[0] with the stored value of flip-flop 252, and will output a logic zero if the two values are the same. XOR gates 214, 216, and 218 perform a similar function for data bits D[1], D[2], and D[3], respectively. When the data input D[3:0] has the same value as the stored value in flip-flops 258, 256, 254, and 252, all outputs of XOR gates 212, 214, 216, and 218 will be at a logic zero.

The outputs of XOR gates 212, 214, 216, and 218 are logically OR-ed by OR gate 222, and the output of OR gate 222 is provided to clock-gate 224. Clock-gate 224 receives the clock signal CLK, and performs a logical AND of the clock signal with the output of OR gate 222. The output of clock-gate 224 is driven as the input clock signal to flip-flops 258, 256, 254, and 252. Thus, when the output of OR gate 222 is a logic zero indicating that data input D[3:0] is equal to their corresponding stored value, the input clock signal to flip-flops 258, 256, 254, and 252 will be disabled. When any of the data input D[3:0] has a different logic value than the stored value, the output of the corresponding XOR gate will be at a logic one, and the output of OR gate 222 will be at a logic one. This enables clock-gate 224 to drive the input clock signal CLK to flip-flops 258, 256, 254, and 252 to allow flip-flops 258, 256, 254, and 252 to update the stored value with the data input D[3:0].

Integrated circuit 200 also groups data bits D[n−1:n−2] together, which is clock-gated by a separate clock-gate circuit 280. Clock-gate circuit 280 includes XOR gates 232 and 234, OR gate 242, and clock-gate 244. The operation of clock-gate circuit 280 is similar to clock-gate circuit 270. When the data input D[n−1:n−2] is equal to the stored value, clock-gate circuit 280 disables the input clock signal to flip-flops 262 and 264. When any bits of data input D[n−1:n−2] is different than the stored value, clock-gate circuit 280 enables the input clock signal to flip-flops 262 and 264 to allow flip-flops 262 and 264 to update the stored value with data input D[n−1:n−2].

Clock-gate circuit 270 disables and enables the clock signal to the flip-flops of D[3:0] independently from the rest of the data bits of data register 290, and clock-gate circuit 280 disables and enables the clock signal to the flip-flops of D[n−1:n−2] independently from the rest of the data bits of data register 290. The other data bits of n-bit data register 290 can be also be grouped into one or more groups that are each independently clock-gated, and/or one or more data bits can be left without being clock-gated if such data bits are expected to toggle frequently. The grouping of the data bits for clock-gating can be chosen strategically such that data bits that are unlikely to toggle frequently can be grouped together, and/or data bits that serve a similar function or represent similar data can be grouped together. It should also be noted that the data bits being grouped together need not be contiguous and can include data bits that are separated by intervening data bits that are not part of the grouping.

In some implementations, the number of data bits being grouped together can also be aligned with the number of data bits available in the integrate circuit's design library for multi-bit flip-flops to take advantage of the multi-bit flip-flop's architecture. In other words, if the design library of the integrate circuit provides a 2-bit wide multi-bit flip flop (MFF), a 4-bit MFF, and an 8-bit MFF, the number of data bits grouped together for clock-gating can be chosen to be 2 bits, 4 bits, or 8 bits such that the flip-flops corresponding to the data bits being grouped together can be implemented using a MFF instead of multiple individual single-bit flip-flops.

Figure 3:
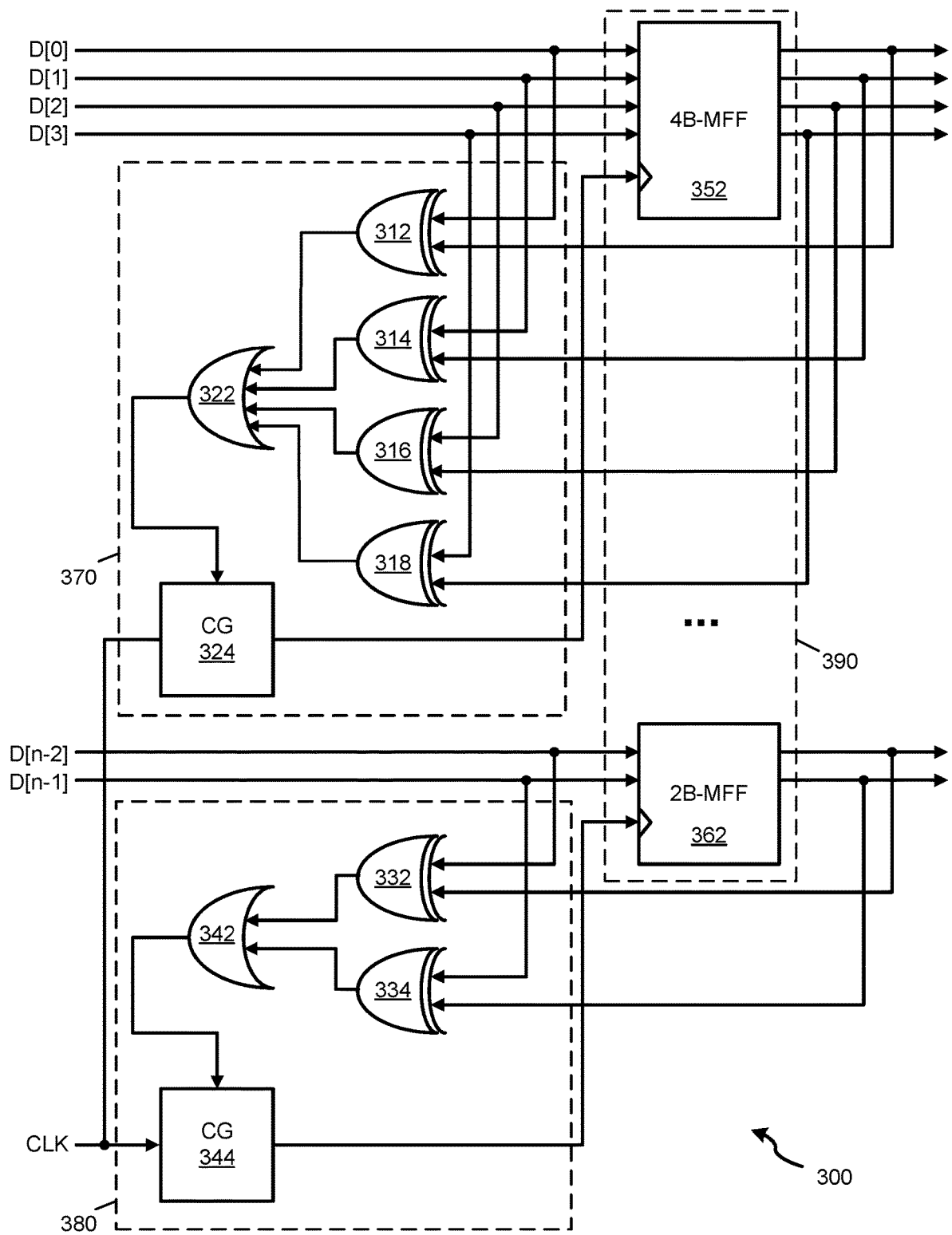
FIG. 3 illustrates a block diagram of another example of an integrated circuit having an n-bit data register.

FIG. 3 illustrates a block diagram of an example of an integrated circuit 300 having an n-bit data register 390 implemented with multi-bit flip-flops. The components of integrated circuit 300 being shown in FIG. 3 includes n-bit data register 390, clock-gate circuit 370, and clock-gate circuit 380. Clock-gate circuit 370 is used to clock-gate data bits D[3:0], and includes XOR gates 312, 314, 316, and 318, OR gate 322, and clock-gate 324. Clock-gate circuit 380 is used to clock-gate data bits D[n−1:n−2], and includes XOR gates 332 and 334, OR gate 342, and clock-gate 344. The functionality of integrated circuit 300 is similar to that of integrated circuit 200. As such, a detailed description of which need not be repeated.

In FIG. 3, the n-bit data register 390 is implemented using MFFs instead of multiple single-bit flip-flops as in FIG. 2. The advantage of using MFFs may include reducing leakage and dynamic power consumption by reducing clock tree routing and buffers. The use of MFFs can also improve the density of the integrated circuit design by reducing the standard cell area, because connections between the flip-flops and the layout of test logic such as boundary scan chain in the MFF are optimized locally inside the MFF. The grouping of data bits for clock-gating can be aligned with the available data bit widths of MFFs in the design library. Thus, the flip-flops corresponding to D[3:0] that are clock-gated by clock-gate circuit 370 can be implemented with a 4-bit MFF 352, and the flip-flops corresponding to D[n−1:n−2] that are clock-gated by clock-gate circuit 380 can be implemented with a 2-bit MFF 362.

Figure 4:
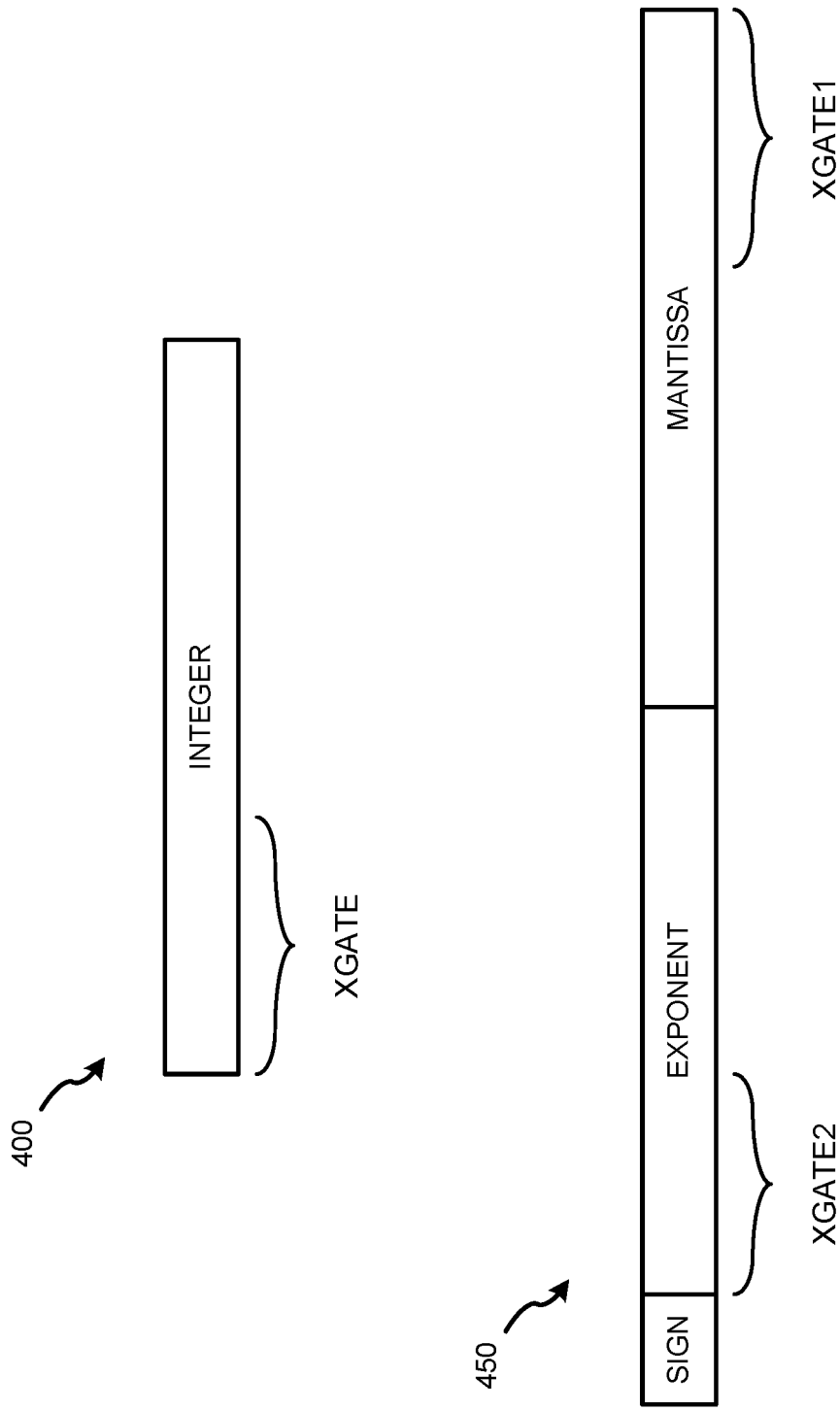
FIG. 4 illustrates a conceptual diagram of examples of groupings of data bits for clock-gating.

FIG. 4 illustrates a conceptual diagram of examples of how data bits of different data types can be grouped for clock-gating purposes. Data register 400 shown in FIG. 4 is used to store an integer data type. If the integer value is expected to be small based on the particular application, then the most significant bits of data register 400 are not expected to toggle frequently and will generally remain zero. As such, the most significant bits of data register 400 can be grouped together, and be clock-gated by a clock-gate circuit XGATE independently from the rest of data register 400.

As another example, data register 450 shown in FIG. 4 is used to store a floating-point data type. The floating-point data type includes a sign bit, an exponent, and a mantissa. If the floating-point value is expected to be small based on the particular application, then the most significant bits of the exponent are not expected to toggle frequently and will generally remain zero. As such, the most significant bits of the exponent can be grouped together, and be clock-gated by a clock-gate circuit XGATE2 independently from the rest of data register 400. If the floating-point value is expected to have less precision that the number of available bits in the mantissa, then the least significant bits of the mantissa can be grouped together, and be clock-gated by a clock-gate circuit XGATE1 independently from the rest of data register 400.

Figure 5:
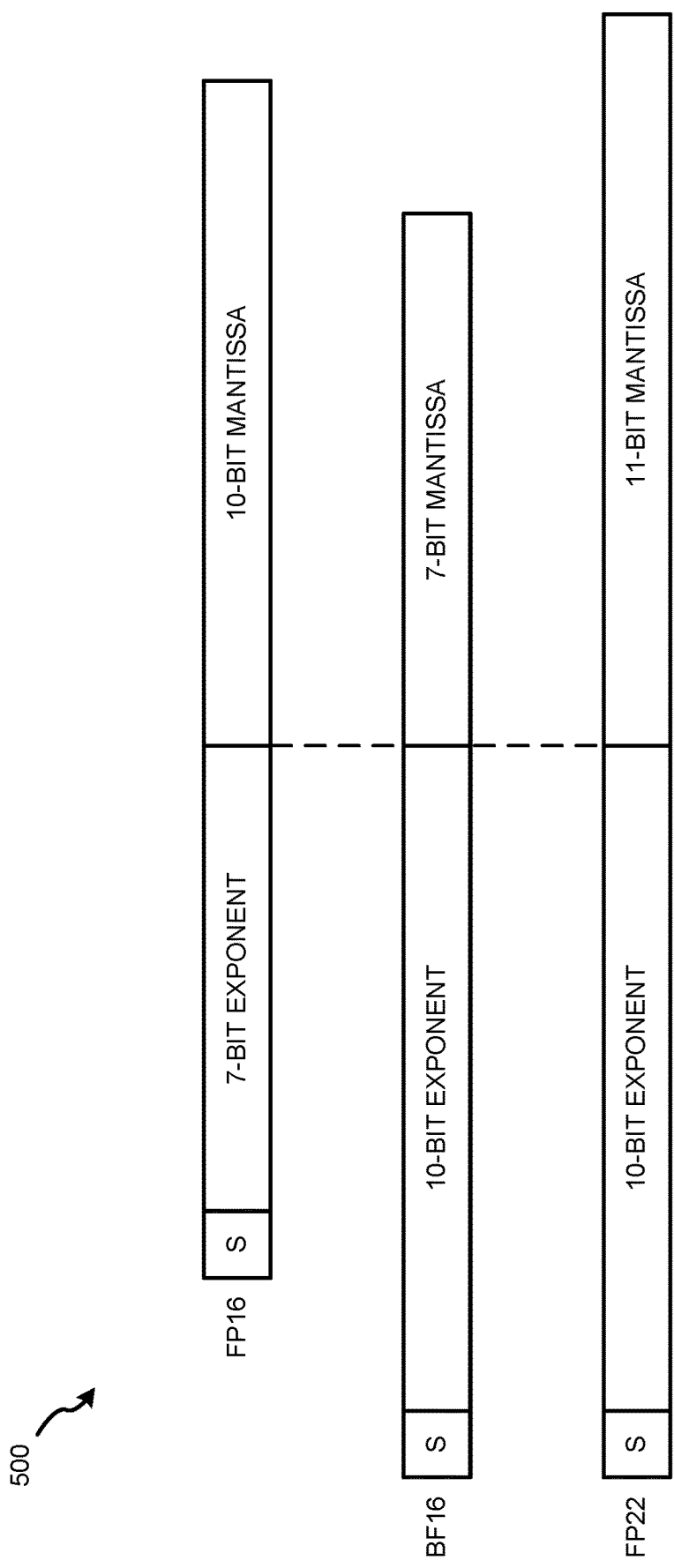
FIG. 5 illustrates an example of a data register supporting multiple data types.

FIG. 5 illustrates a conceptual diagram 500 of an example of a data register that can support multiple data types. In the example shown, the FP22 data register is the implementation in hardware. The FP22 data register can include a single sign bit register, a 10-bit exponent register, and a 11-bit mantissa register. The FP22 data register can support storing, for example a FP16 number or a BF16 number. The boundary between the exponent and the mantissa is maintained between the different data types. As such, when storing the BF16 data type, the least significant four bits of the 11-bit mantissa register can be unused. This can be a consideration for grouping the least significant four bits of the 11-bit mantissa register to be clock-gated together.

The clock-gating techniques described above can be extended to an integrated circuit device for performing neural network computations. For example, an integrated circuit device for performing neural network computations may include an array of processing elements arranged in rows and columns. Each of the processing element can include a weight register configured to store a floating-point weight value, and a feature map (FMAP) register configured to store a floating-point FMAP value. Each processing element can also include a multiplier circuit configured to multiply the floating-point FMAP value with the floating-point weight value to generate a multiplication result, and an adder circuit configured to add the multiplication result to a partial sum input to generate a partial sum output. To reduce power consumption, each processing element also includes a weight clock-gate circuit configured to clock-gate a portion of the weight register independently from rest of the weight register, and a FMAP clock-gate circuit configured to clock-gate a portion of the FMAP register independently from rest of the FMAP register.

In implementations in which the floating-point FMAP and weight values are expected to be small, the portion of the weight register being clock-gated can be configured to store an upper portion (most significant bits) of the exponent of the floating-point weight value, and the portion of the FMAP register being clock-gated can be configured to store an upper portion (most significant bits) of the exponent of the floating-point FMAP value. In implementations in which the precision of the floating-point FMAP and weight values do not require full use of the mantissa bits in their respective registers, the portion of the weight register being clock-gated can be configured to store a lower portion of a mantissa of the floating-point weight value, and the portion of the FMAP register being clock-gates can be configured to store a lower portion of the mantissa of the floating-point FMAP value. In some implementations, the integrated circuit device can include addition clock-gate circuits to clock-gate other portions of the weight and/or FMAP registers. For example, the integrated circuit device may include another weight clock-gate circuit configured to clock-gate another portion of the weight register independently from the portion of the weight register gated by the first weight clock-gate circuit, and/or another FMAP clock-gate circuit configured to clock-gate another portion of the FMAP register independently from the portion of the FMAP register gated by the first FMAP clock-gate circuit.

More generally, the weight register and/or the FMAP register can support multiple data types (e.g., FP16, BF16, etc.), and the group of weight/FMAP data bits being clock-gated together can be unused data bits for one or more of the data types being supported. The group of weight/FMAP data bits being clock-gated together can also be data bits that remain unchanged for weight/FMAP values that are within a weight/FMAP value range that the neural network frequently operates on.

Figure 6A:
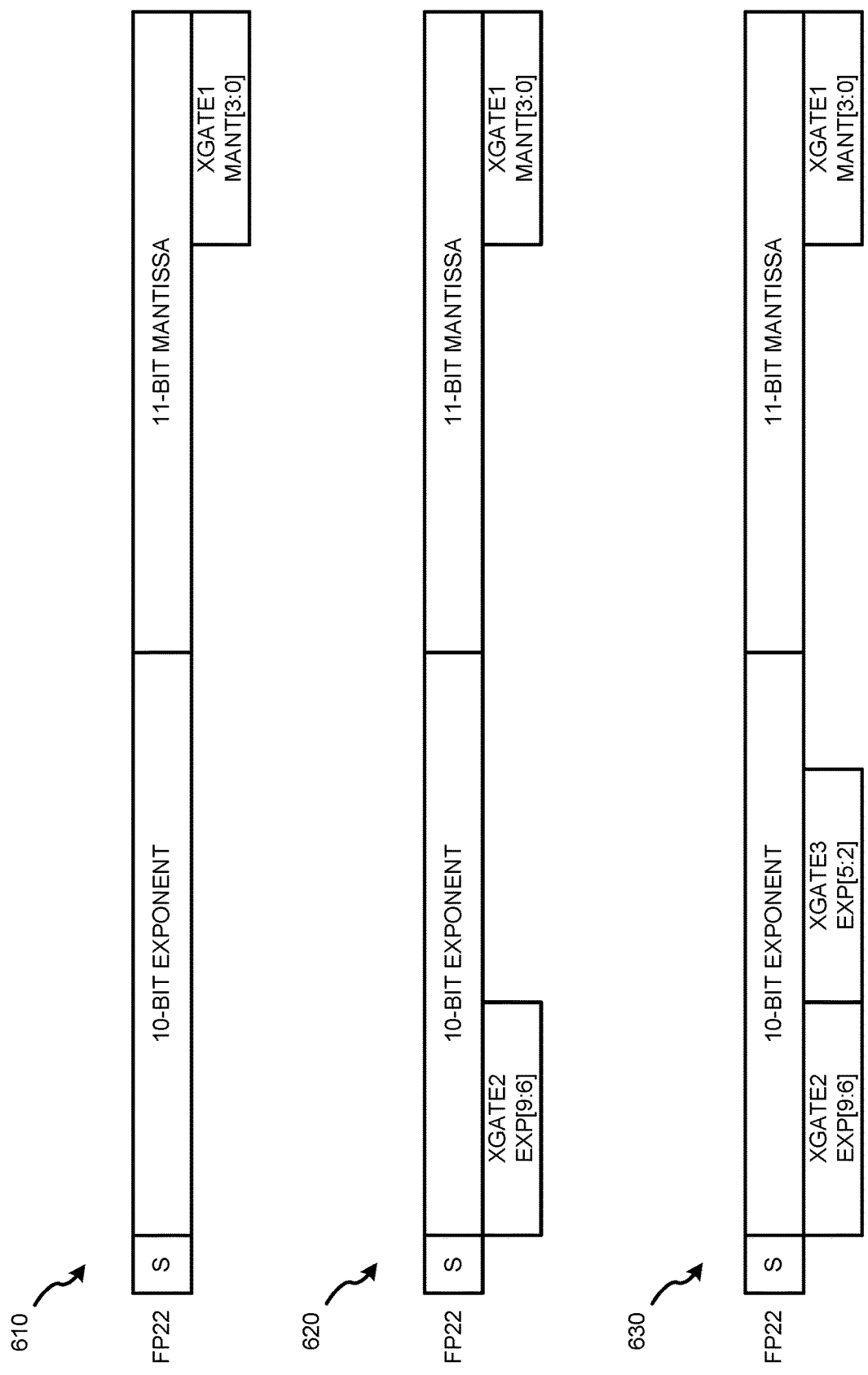
FIG. 6A illustrates examples of groupings of data bits of a floating-point data register for clock-gating.
Figure 6B:
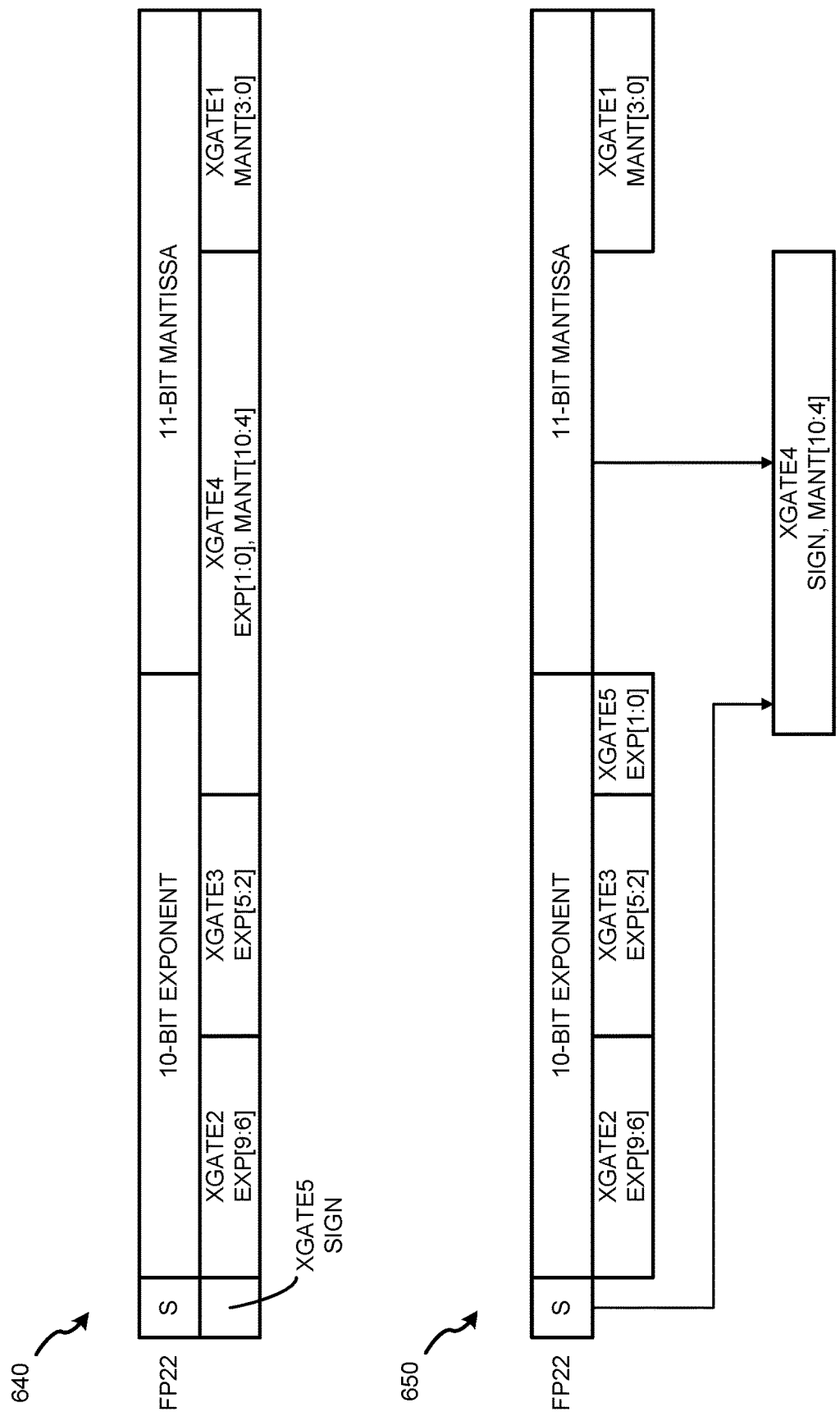
FIG. 6B illustrates additional examples of groupings of data bits of a floating-point data register for clock-gating.

FIGS. 6A-6B illustrate various examples of groupings of data bits of a floating-point data register for clock-gating to reduce power consumption. The circuitry of the data registers and clock-gate circuits can be similar to those of integrated circuits 200 and 300 shown in FIGS. 2-3. Although the implementation of the data register in FIGS. 6A-6B is shown as having a 22-bit floating point (FP22) format (e.g., to implement FMAP register 114 or weight register 124 of FIG. 1), it should be understood that the technique described herein can be applied to floating-point numbers having a different number of exponent and/or mantissa bits, as well as data registers that store other data types or formats.

Referring to FIG. 6A, data register circuit 610 includes a data register having a sign register configured to store a sign bit of the floating-point number, an exponent register configured to store an exponent of the floating-point number, and a mantissa register configured to store a mantissa of the floating-point number. In implementations in which the floating-point number has a FP22 format, the exponent register is configured to store a 10-bit exponent, and the mantissa register is configured to store a 11-bit mantissa. In some implementations, the floating-point number can be a weight value or a feature map value for a neural network computation.

Data register circuit 610 also includes a clock-gate circuit XGATE1 configured to clock-gate a lower portion (least significant bits) of the mantissa register independently from rest of the mantissa register. In the example shown in FIG. 6A, the four least significant bits of the mantissa (e.g., MANT[3:0]) are grouped together and clock-gated by XGATE1. Recall from FIG. 1 that the FP22 native format provides support for various input data type include BF16, which is frequently used in hardware acceleration machine learning algorithms. The BF16 data type includes a single sign bit, a 10-bit exponent, and a 7-bit mantissa. Thus, when converting BF16 to FP22, the last four bits of the mantissa register is not used as shown in FIG. 5. By grouping the four least significant bits of the mantissa (e.g., MANT[3:0]) together to be clock-gated by XGATE1, the clock input to these unused flip-flops when processing BF16 numbers will be disabled to reduce power consumption. Grouping the four mantissa bits together also allows the flip-flops of these mantissa bits to be implemented using a 4-bit MFF.

Data register circuit 620 is similar to data register circuit 610, and further includes a clock-gate circuit XGATE2 configured to clock-gate an upper portion (most significant bits) of the exponent register independently from rest of the exponent register. In the example shown in FIG. 6A, the four most significant bits of the exponent (e.g., EXP[9:6]) are grouped together and clock-gated by XGATE2. Neural networks frequently perform calculations on small values such as small weights and small gradients, and thus the exponent value tends to be small. As such, in many cases, the upper portion of the exponent does not toggle. However, these values are not necessarily positive and may change signs. As such, the upper portion of the exponent is clock-gated without the sign bit. Grouping the four exponent bits together also allows the flip-flops of EXP[9:6] to be implemented using a 4-bit MFF.

Data register circuit 620 is similar to data register circuit 610, and further includes a clock-gate circuit XGATE2 configured to clock-gate an upper portion (most significant bits) of the exponent register independently from rest of the exponent register. In the example shown in FIG. 6A, the four most significant bits of the exponent (e.g., EXP[9:6]) are grouped together and clock-gated by XGATE2. Neural networks frequently perform calculations on small values such as small weights and small gradients, and thus the exponent value tends to be small. As such, in many cases, the upper portion of the exponent does not toggle. However, these values are not necessarily positive and may change signs. As such, the upper portion of the exponent is clock-gated without the sign bit. Grouping the four exponent bits together also allows the flip-flops of EXP[9:6] to be implemented using a 4-bit MFF.

Data register circuit 630 is similar to data register circuit 620, and further includes a clock-gate circuit XGATE3 configured to clock-gate a middle portion (middle bits) of the exponent register independently from rest of the exponent register. In the example shown in FIG. 6A, four middle bits of the exponent (e.g., EXP[5:2]) are grouped together and clock-gated by XGATE3. In addition to performing calculations on small values, neural networks oftentimes operate on extremely small values (e.g., post-ReLU activations, small gradients, sparse weights). Taking this into account, the middle bits of the exponent can be clock-gated separately. Grouping the four exponent bits together also allows the flip-flops of EXP[5:2] to be implemented using a 4-bit MFF.

Referring now to FIG. 6B, data register circuit 640 is similar to data register circuit 630, and further includes additional clock-gate circuits XGATE4 and XGATE5. In addition to operating on small and extremely small values, neural networks also tend to operate on a high occurrence of zero values due to sparse weight matrices and/or post-ReLU activations. Accounting for the likelihood of operating on zero values, data register circuit 640 groups the remaining portions of the exponent register and the mantissa register together, or the lower portion of the exponent register with the upper portion of the mantissa register (e.g., EXP[1:0] and MANT[10:4]) to be clock-gated by XGATE4. The sign bit register is clock-gated on its own by XGATE5. Although the remaining data bits of data register circuit 640 can be grouped in the manner shown, XGATE4 and XGATE5 each clock-gates an odd number of data bits. This grouping does not lend itself to utilize MFFs because MFFs are typically available from a design library in $2^n$ number of data bits.

Data register circuit 650 provides an alternative grouping to data register circuit 640, and allows for the use of MFFs on the remaining data bits of the data register to be aligned with the clock-gating. Data register circuit 650 groups the remaining or lower portion of the exponent register (e.g., EXP[1:0]) together to be clock-gated by XGATE5, and groups the sign bit together with the remaining or upper portion of the mantissa register (e.g., SIGN and MANT[10:4]) to be clock-gated by XGATE4. As both XGATE4 and XGATE5 are used to clock-gate $2^n$ number of data bits, the grouping of data register circuit 650 allows the flip-flops of EXP[1:0] to be implemented using a 2-bit MFF, and the flip-flops of SIGN and MANT[10:4] to be implemented using an 8-bit MFF.

It should be understood that while FIGS. 6A-6B show various examples of how data bits of a FP22 register can be grouped together for clock-gating, other implementations can group the data bits in a different manner or use different combinations of the clock-gating shown. Furthermore, one or more data bits can be left without being clock-gated. For example, data bits that are expected to toggle frequently can omit any clock-gating because the minimal power savings may not justify the additional layout area required for the clock-gate circuit. The clock-gating techniques described herein are also not limited to FP22 or floating-point data types, and can be applied outside the context of neural networks and to data registers storing other types of data.

More generally, depending on the particular application or data types of the workload that an integrated circuit device operates on, data bits or portions of a data register that are not expected to toggle frequently can be grouped together, and be clock-gated independently from the rest of the data register. For a data register configured to store a numeric value that supports multiple data types, a clock-gate circuit can be provided to clock-gate a portion of the data register independently from rest of the data register. The portion of the data register being clock-gated may store a group of data bits that are unused for one or more data types of the multiple data types supported by the data register. By way of example, if the data register is a 16-bit data register and one of the supported data types is an 8-bit integer, then 8 data bits of the data register may be unused when operating on an 8-bit integer, As such, the 8 data bits of the data register that are unused can be grouped together and be clock-gated by the clock-gate circuit.

Alternatively or additionally, the portion of the data register being clock-gated may store a group of data bits that remains unchanged or has a constant value for numeric values within a numeric range that is frequently operated on. By way of example, if the data register is an 8-bit data register for storing integers, and integers in the range of 240 to 255 are frequently operated on, then the upper four data bits of the data register can be grouped together and be clock-gated by a clock-gate circuit. This can be done because the upper four bits of the data register have a constant value of b1111 and remain unchanged when the numeric value being operated on is in the range of 240 to 255.

It should be understood that a data register can be provided with multiple clock-gate circuits that each clock-gates a different group of data bits, and that each grouping of data bits can be chosen for either of the reasons discussed above. Furthermore, the grouping selection can also take into account the bit width of available multi-bit flip-flops in the design library to align the clock-gating with multi-bit flip-flop implementations. In other words, the grouping of the data bits can be selected such that the group of data bits being clock-gated together can be implemented using a multi-bit flip flop.

Figure 7A:
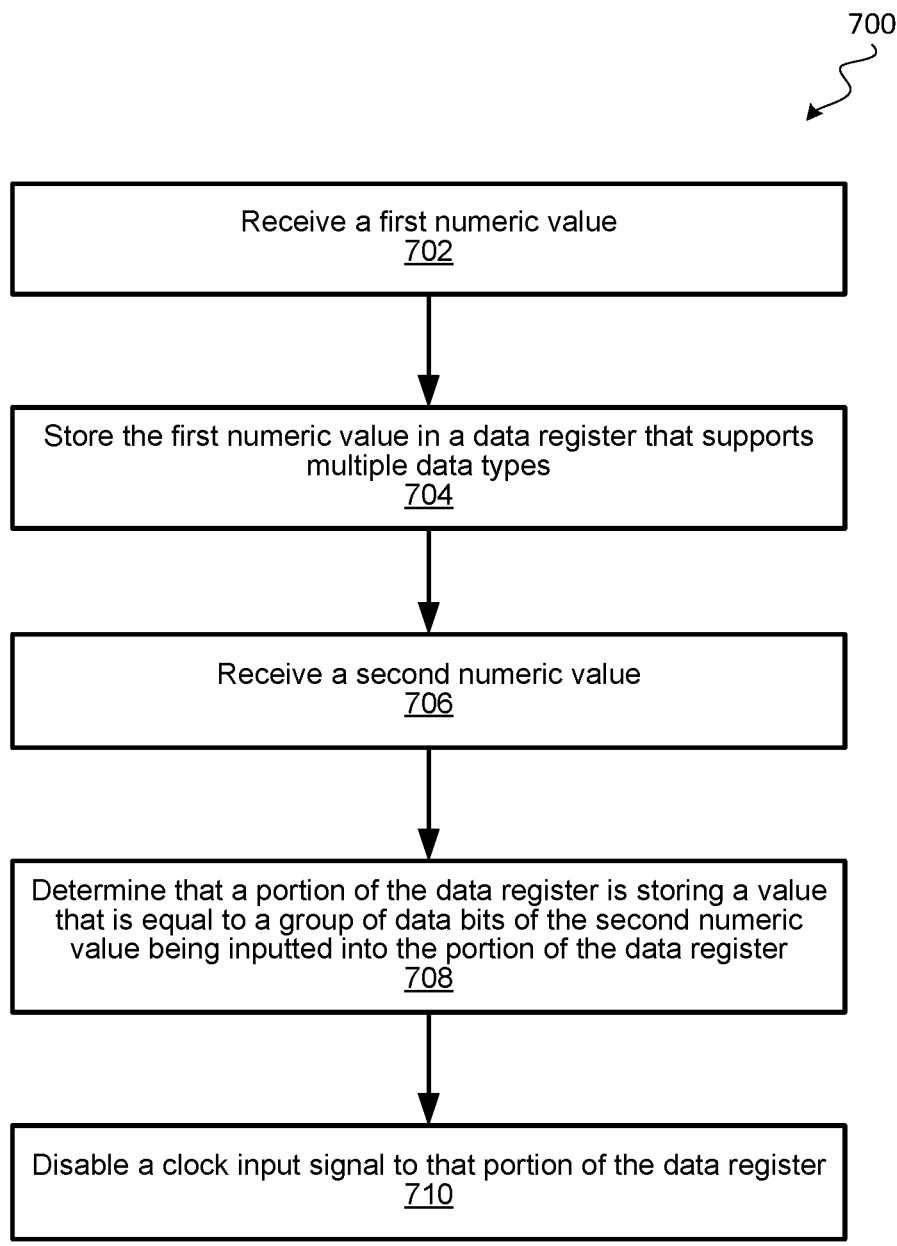
FIG. 7A illustrates a flow diagram of an example process for clock-gating a data register.

FIG. 7A illustrates a flow diagram of an example process 700 for clock-gating a data register. Process 700 can be performed, for example, by a data register circuit such as those described herein. The data register circuit can be a data register that supports multiple data types. The data register circuit can be implemented using individual single-bit flip-flops, multi-bit flip-flops, or a combination thereof.

Process 700 may begin at block 702 by a data register circuit receiving a first numeric value (e.g., integer, floating-point number, etc.). At block 704, the first numeric value is stored in the data register. At block 706, the data register circuit receives a second numeric value. At block 708, in response to receiving the second numeric value, the data register circuit determines that a portion of the data register is storing a value that is equal to a group of data bits of the second numeric value being inputted into that portion of the data register. The determination can be made, for example, by a series of XOR gates that compares the output of a flip-flop with its corresponding input data bit.

The group of data bits may be unused for one or more of the data types supported by the data register, or the group of data bits may have a constant value for numeric values within a numeric range that is frequently operated on. In some implementations, the number of data bits in the portion of the data register being compared can be aligned with the available bit width of multi-bit flip-flops (e.g., $2^n$ number of data bits) available in the design library of the data register circuit. In such implementations, the portion of the data register can be implemented using a multi-bit flip flop.

At block 710, the clock input signal to the portion of the data register can be disabled to reduce power consumption without affecting the functionality of the data register because the input data to that portion of the data register is equal to the stored value. Process 700 may also disable the clock input signal to multiple portions of the data register when multiple portions are storing the same value as the corresponding portions of the input data.

The clock input signal to the portion of the data register can be re-enabled when new input data that is different than the stored value is received. For example, assume that the clock input signal to the portion of the data register has been disabled, and a third numeric value has been received. In response to receiving the third numeric value, if it is determined that the portion of the data register is storing a value that is different than the group of data bits of the third numeric value being inputted into the portion of the data register, then the clock input signal to the portion of the data register can be enabled to allow the portion of the data register to be updated with the newly received value.

Figure 7B:
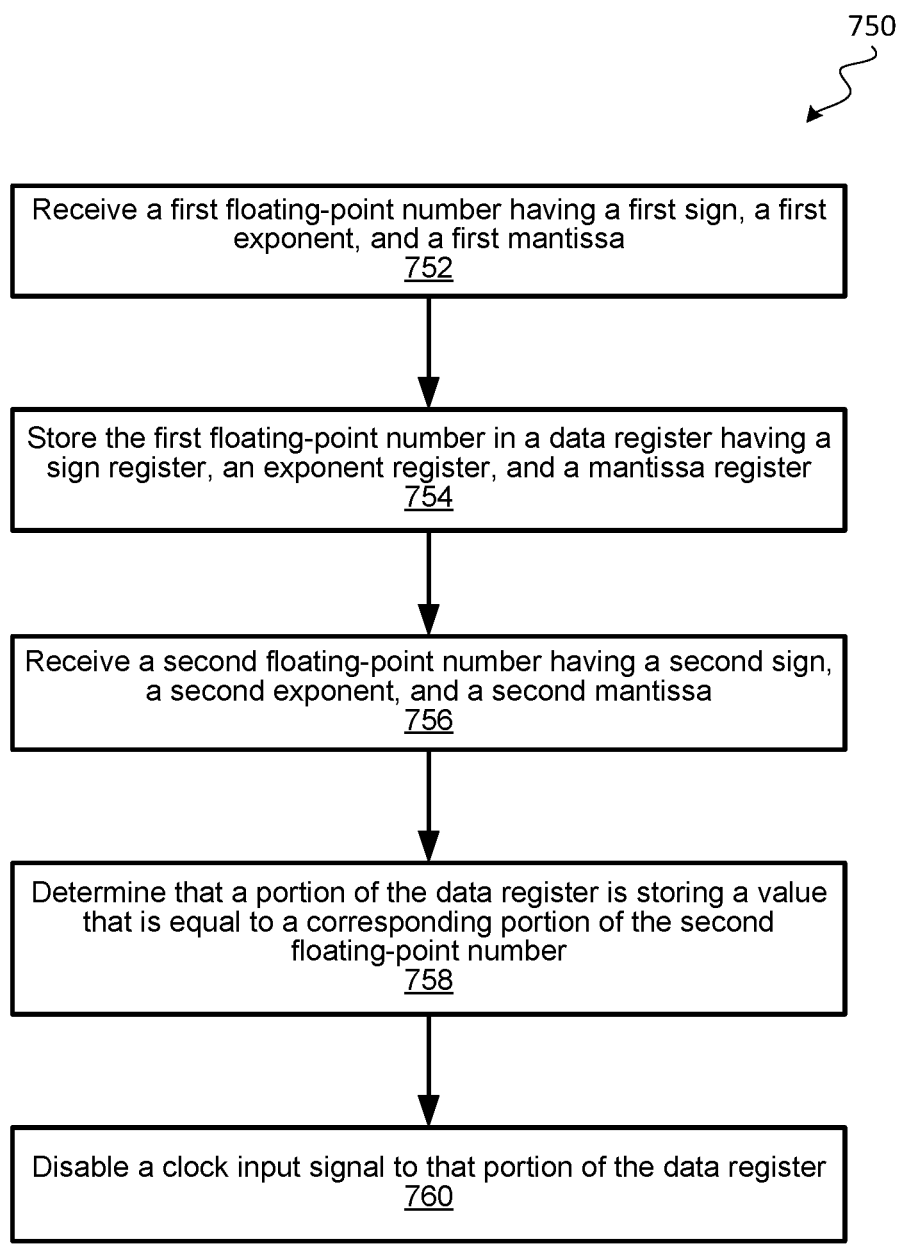
FIG. 7B illustrates a flow diagram of an example process for clock-gating a floating-point data register.

FIG. 7B illustrates a flow diagram of an example process 750 for clock-gating a data register. Process 750 can be performed, for example, by a data register circuit such as those described herein. Although process 750 is described in context of storing a floating-point number, the clock-gating technique can be used in data registers that store other types of data.

Process 750 may begin at block 752 by a data register circuit receiving a first floating-point number. The first floating point number includes a first sign, a first exponent, and a first mantissa. The sign is typically represented as a single data bit. The exponent and mantissa can each take on any number of data bits depending on the floating-point format, and the dynamic range and precision of the particular application. At block 754, the first floating-point number is stored in the data register. The data register includes a sign register to store the sign bit, an exponent register to store the exponent, and a mantissa register to store the mantissa. The data register can be implemented using individual single-bit flip-flops, multi-bit flip-flops, or a combination thereof.

At block 756, the data register circuit receives a second floating-point number. The second floating point number includes a second sign, a second exponent, and a second mantissa. At block 758, in response to receiving the second floating-point number, the data register circuit determines that a portion of the data register is storing a value that is equal to a corresponding portion of the second floating-point number. The determination can be made, for example, by a series of XOR gates that compares the output of a flip-flop with its corresponding input data bit. In some implementations, the number of data bits in the portion of the data register being compared can be aligned with the available bit width of multi-bit flip-flops (e.g., $2^n$ number of data bits) available in the design library of the data register circuit. At block 760, the clock input signal to the portion of the data register can be disabled to reduce power consumption without affecting the functionality of the data register because the input data to that portion of the data register is equal to the stored value.

By way of example, in response to receiving the second floating-point number, process 750 may determine that an upper portion of the exponent register is storing a value that is equal to an upper portion of the second exponent, and disable the clock input signal to the upper portion of the exponent register to prevent the upper portion of the exponent register from toggling. As another example, in response to receiving the second floating-point number, process 750 may determine that a lower portion of the mantissa register is storing a value that is equal to a lower portion of the second mantissa, and disable a clock input signal to the lower portion of the mantissa register to prevent the lower portion of the mantissa register from toggling. As a further example, in response to receiving the second floating-point number, process 750 may determine that the sign register is storing a value that is equal to the second sign, and disable a clock input signal to the sign register to prevent the sign register from toggling. Process 750 may also disable the clock input signal to multiple portions of the data register when multiple portions are storing the same value as the corresponding portions of the input data.

The clock input signal to the portion of the data register can be re-enabled when new input data that is different than the stored value is received. For example, assume that the clock input signal to the upper portion of the exponent register has been disabled, and a third floating-point number having a third sign, a third exponent, and a third mantissa has been received. In response to receiving the third floating-point number, if it is determined that an upper portion of the exponent register is storing a value that is different than an upper portion of the third exponent, then the clock input signal to the upper portion of the exponent register can be enabled to allow the upper portion of the exponent register to be updated with the newly received value.

Figure 8:
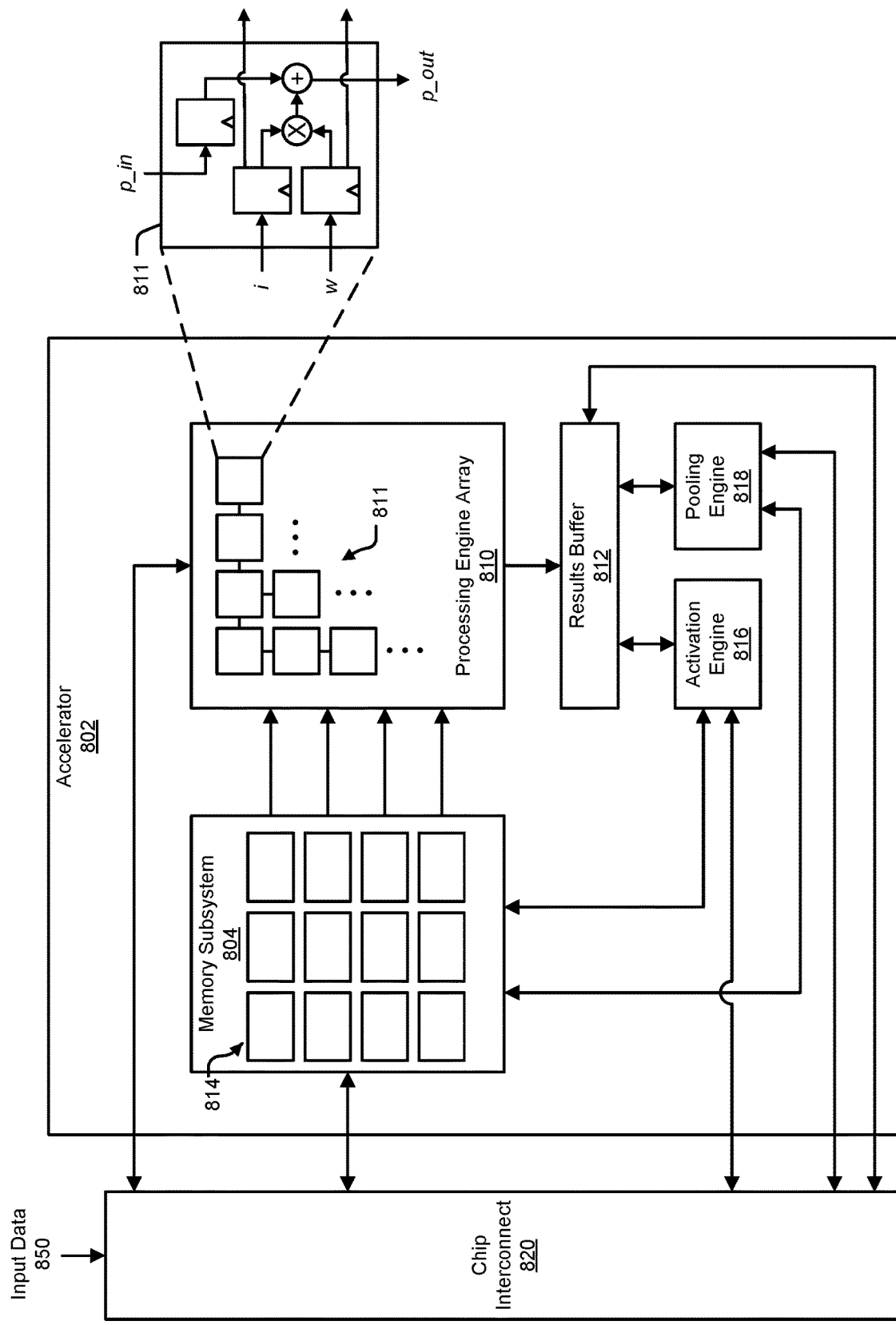
FIG. 8 illustrates a block diagram of an example of an integrated circuit device.

FIG. 8 is a block diagram illustrating an example of an integrated circuit device that can include the examples of data register circuit described herein. The example of FIG. 8 illustrates an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, pout, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
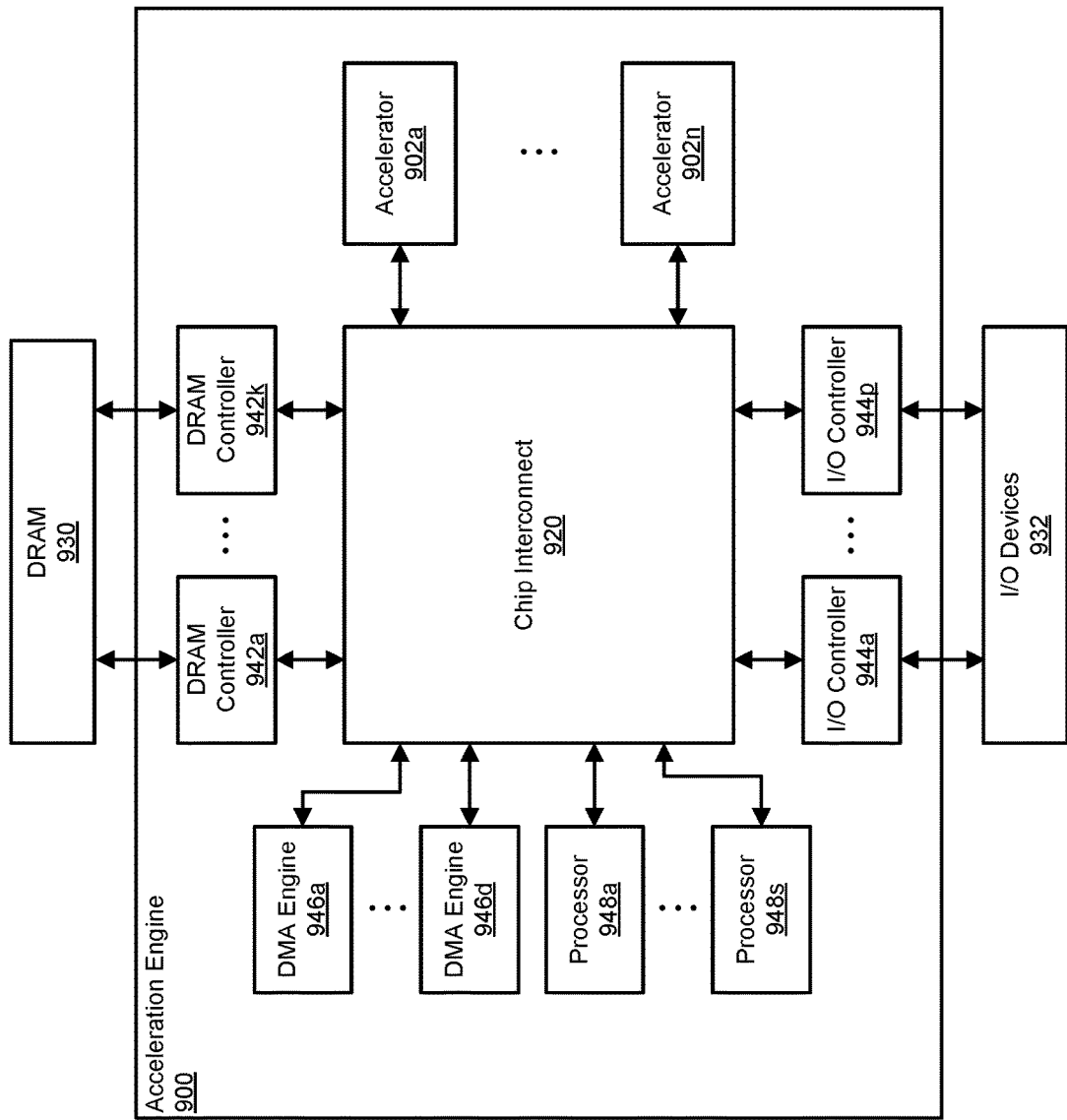
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueuing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-

946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
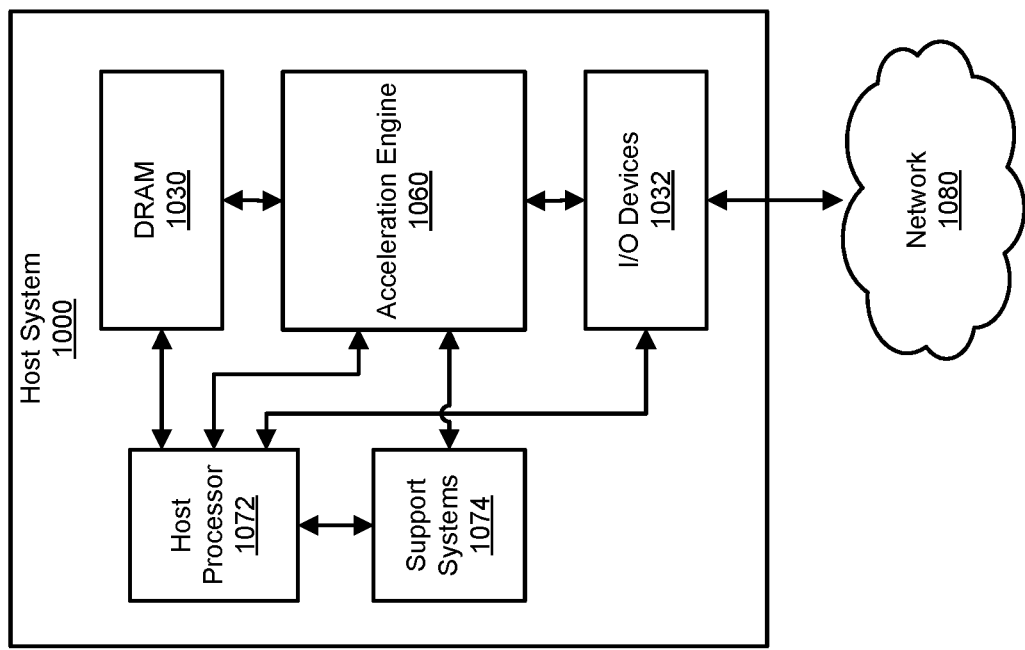
FIG. 10 includes a block diagram that illustrates an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
   an array of processing elements arranged in rows and columns, wherein each processing element includes:
      a weight register configured to store a floating-point weight value that supports a plurality of data types;
      a first weight clock-gate circuit configured to clock-gate a first portion of the weight register independently from rest of the weight register based on a clock enable signal, wherein the first portion of the weight register is configured to store a first group of weight data bits, wherein the clock enable signal is generated by combining results of comparing each bit stored in the first portion of the weight register with a corresponding input bit of an input to the first portion of the weight register, and wherein the first group of weight data bits is unused for a first data type, and includes both used and unused bits for a second data type;
      a feature map (FMAP) register configured to store a floating-point FMAP value that supports the plurality of data types;
      a first FMAP clock-gate circuit configured to clock-gate a first portion of the FMAP register independently from rest of the FMAP register, wherein the first portion of the FMAP register is configured to store a first group of FMAP data bits that are unused for a second data type of the plurality of data types;
      a multiplier configured to multiply the floating-point FMAP value with the floating-point weight value to generate a multiplication result; and
      an adder configured to add the multiplication result to a partial sum input to generate a partial sum output.

2. The integrated circuit device of claim 1, wherein the first group of weight data bits corresponds to a lower portion of a mantissa of the floating-point weight value, and the first group of FMAP data bits corresponds to a lower portion of a mantissa of the floating-point FMAP value.

3. The integrated circuit device of claim 1, further comprising:
   a second weight clock-gate circuit configured to clock-gate a second portion of the weight register independently from the first portion of the weight register, wherein the second portion of the weight register is configured to store a second group of weight data bits that remains unchanged for weight values within a weight value range; and
   a second FMAP clock-gate circuit configured to clock-gate a second portion of the FMAP register independently from the first portion of the FMAP register, wherein the second portion of the FMAP register is configured to store a second group of FMAP data bits that remains unchanged for FMAP values within a FMAP value range.

4. The integrated circuit device of claim 3, wherein the second group of weight data bits corresponds to an upper portion of an exponent of the floating-point weight value, and the second group of FMAP data bits corresponds to an upper portion of an exponent of the floating-point FMAP value.

5. An integrated circuit device comprising:
   a data register configured to store a numeric value that supports a plurality of data types that are used in computations performed by the integrated circuit device, the plurality of data types including a first data type and a second data type;
   a first clock-gate circuit configured to clock-gate a first portion of the data register independently from a first remaining portion of the data register based on a single-bit clock enable signal, the first portion of the data register storing a first group of data bits, wherein the single-bit clock enable signal is generated by combining results of comparing each bit stored in the first portion of the data register with a corresponding input bit of an input to the first portion of the data register, and wherein the first group of data bits is unused for the first data type, and includes both used and unused bits for the second data type; and
   a second clock-gate circuit configured to clock-gate a second portion of the data register independently from a second remaining portion of the data register, the second portion of the data register storing a second group of data bits that have a constant value for numeric values within a numeric range,
   wherein the first remaining portion of the data register is the data register excluding the first portion of the data register, and the second remaining portion of the data register is the data register excluding the second portion of the data register.

6. The integrated circuit device of claim 5, wherein the numeric value is a floating-point number,
   wherein the data register includes a sign register configured to store a sign bit of the floating-point number, an exponent register configured to store an exponent of the floating-point number, and a mantissa register configured to store a mantissa of the floating-point number, and
   wherein the first group of data bits corresponds to a lower portion of the mantissa register.

7. The integrated circuit device of claim 6, wherein the lower portion of the mantissa register is implemented using a multi-bit flip flop.

8. The integrated circuit device of claim 6, wherein the second group of data bits corresponds to an upper portion of the exponent register.

9. The integrated circuit device of claim 8, wherein the upper portion of the exponent register is implemented using a multi-bit flip flop.

10. The integrated circuit device of claim 6, further comprising a third clock-gate circuit configured to clock-gate a lower portion of the exponent register with an upper portion of the mantissa register.

11. The integrated circuit device of claim 6, further comprising a third clock-gate circuit configured to clock-gate the sign register with an upper portion of the mantissa register.

12. The integrated circuit device of claim 6, wherein the exponent register is configured to store a 10-bit exponent, and the mantissa register is configured to store an 11-bit mantissa.

13. The integrated circuit device of claim 12, wherein the plurality of data types includes a floating-point 16 (FP16) data type and a brain floating-point (BF16) data type.

14. The integrated circuit device of claim 6, wherein the floating-point number is a weight value or a feature map value for a neural network computation.

15. The integrated circuit device of claim 5, wherein the numeric value is an integer.

16. The integrated circuit device of claim 15, wherein the first portion of the data register and the second portion of the data register are each implemented using a multi-bit flip flop.

17. A method comprising:
receiving a first numeric value;
storing the first numeric value in a data register that supports a plurality of data types that are used in computations performed by an integrated circuit device, the plurality of data types including a first data type and a second data type;
receiving a second numeric value containing a group of data bits having a same logic value as a value stored in a portion of the data register; and
in response to receiving the second numeric value:
deasserting a single-bit clock enable signal that is generated by combining results of comparing each bit stored in the portion of the data register with a corresponding bit in the group of data bits of the second numeric value, wherein the group of data bits is unused in the first data type and includes both used and unused bits in the second data type; and
disabling a clock input signal to the portion of the data register based on the single-bit clock enable signal.

18. The method of claim 17, wherein the portion of the data register is implemented with a multi-bit flip flop.

19. The method of claim 18, wherein the portion of the data register is a lower portion of a mantissa register, or an upper portion of an exponent register.

20. The method of claim 17, further comprising:
receiving a third numeric value; and
in response to receiving the third numeric value:
determining that the value that the portion of the data register is storing is different than a group of data bits of the third numeric value being inputted into the portion of the data register; and
enabling the clock input signal to the portion of the data register to allow update of the portion of the data register.

* * * * *